United States Patent
Nakagawa et al.

(10) Patent No.: US 6,882,628 B2
(45) Date of Patent: Apr. 19, 2005

(54) COMMUNICATION APPARATUS AND METHOD

(75) Inventors: Hideyuki Nakagawa, Ome (JP); Junichi Yoshizawa, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 920 days.

(21) Appl. No.: 09/732,919

(22) Filed: Dec. 11, 2000

(65) Prior Publication Data

US 2001/0040873 A1 Nov. 15, 2001

(30) Foreign Application Priority Data

Dec. 20, 1999 (JP) ............................................. 11-361293

(51) Int. Cl.[7] .............................. H04J 3/14; H04Q 7/34
(52) U.S. Cl. ....................... 370/252; 370/332; 370/465; 455/452.2; 725/95
(58) Field of Search ................................ 370/252, 328, 370/329, 331, 332, 333, 350, 465, 468, 503; 455/450, 452.1, 452.2, 509, 512, 513; 709/223, 226, 227, 229; 718/100, 102, 104, 105; 725/87, 91, 93, 95, 98, 118, 148

(56) References Cited

U.S. PATENT DOCUMENTS

| | | | | |
|---|---|---|---|---|
| 5,093,924 A | * | 3/1992 | Toshiyuki et al. | 455/450 |
| 6,134,220 A | * | 10/2000 | Le Strat et al. | 370/252 |
| 6,236,478 B1 | * | 5/2001 | Stoll | 398/27 |
| 6,393,031 B1 | * | 5/2002 | Isomura | 370/444 |

FOREIGN PATENT DOCUMENTS

| | | |
|---|---|---|
| JP | 9-149455 | 6/1997 |
| JP | 10-164654 | 6/1998 |

* cited by examiner

*Primary Examiner*—Alpus H. Hsu
(74) *Attorney, Agent, or Firm*—Finnegan, Henderson, Farabow, Garrett & Dunner, L.L.P.

(57) ABSTRACT

The communication apparatus appropriately allocates a plurality of communication tasks to a plurality of communication systems based on the channel qualities of the respective communication systems at that time, so that the communication tasks can be processed in parallel by the communication systems. Accordingly, the communication system, to which a communication task is allocated, can be changed to another communication system without interrupting the communication task while maintaining the synchronization with the other end of communication.

26 Claims, 9 Drawing Sheets

| COMMUNICATION SYSTEM | CHANNEL QUALITY |
|---|---|
| BLUETOOTH | BEST |
| IrDA | BETTER |
| USB | BAD |

FIG. 4

| COMMUNICATION SYSTEM | COMMUNICATION RATE (/bps) |
|---|---|
| BLUETOOTH | 1M |
| IrDA | 4M |
| USB | 12M |

FIG. 5

| COMMUNICATION TASK | FILE SIZE |
|---|---|
| FILE TRANSFER 1 | 500k byte |

FIG. 6

| COMMUNICATION TASK | FILE SIZE |
|---|---|
| FILE TRANSFER 1 | 500k byte |
| FILE TRANSFER 2 | 4M byte |

COMMUNICATION APPARATUS AND METHOD

CROSS-REFERENCE TO RELATED APPLICATIONS

This application is based upon and claims the benefit of priority from the prior Japanese Patent Application No. 11-361293, filed Dec. 20, 1999, the entire contents of which are incorporated herein by reference.

BACKGROUND OF THE INVENTION

The present invention relates to a communication apparatus and method for processing a plurality of communication tasks in parallel by means of a plurality of communication systems incorporated in, for example, a personal computer, and more particularly to a communication apparatus and method which can dynamically and appropriately control allocation of communication tasks to communication systems according to the circumstances.

As information communicating technology has been developed in recent years, various communication systems of different communication modes have been developed in the fields of both radio communications and cable communications. In particular, radio communication systems for use in a personal environment, such as IrDA, Bluetooth, and Home RF, have recently attracted public attention. It will be unavoidably required that the radio communication systems be used each in its proper situation according to the purpose.

Jpn. Pat. Appln. KOKAI Publications Nos. 9-149455 and 10-164654 discloses a communication apparatus having a plurality of communication systems, for example, a cable communication system A and radio communication systems B and C. To satisfy the requirement described above, these publications propose a technique in which an application program for generating communication tasks choose an optimal one from the communication systems based on the qualities of the channels of the respective communication systems.

The conventional communication apparatus mentioned above is advantageous in that a communication system of the best quality channel can be chosen. However, the conventional apparatus has the following problem.

When a plurality of communication tasks occur, the conventional communication apparatus chooses one communication system based on the channel quality. All the communication tasks are performed by using only the chosen system in a first-in first-out or time division manner. In other words, the communication tasks are not processed in parallel by the communication systems. Thus, the operation of the apparatus cannot be effective relative to the number of communication systems.

BRIEF SUMMARY OF THE INVENTION

An object of the present invention is to provide a communication apparatus and method for processing a plurality of communication tasks in parallel by means of a plurality of communication systems by dynamically and appropriately controlling allocation of communication tasks to communication systems according to the circumstances.

To achieve the above object, the communication apparatus of the present invention dynamically and appropriately allocate a plurality of communication tasks to a plurality of communication systems of different communication modes based on the channel qualities of the respective communication systems, so that the communication tasks can be effectively processed. Accordingly, the communication system, to which a communication task is allocated, can be changed to another communication system without interrupting the communication under execution in synchronism with the other end of communication.

With the communication apparatus of the present invention, a plurality of communication tasks can be processed in parallel by appropriately allocating the communication tasks to the communication systems based on the channel qualities of the respective communication systems.

Further, the channel qualities are observed periodically, and if necessary, the communication system, to which a communication task is allocated, can be changed to another communication system while maintaining the communication. Thus, the optimization of allocation of the communication tasks to the communication systems can be performed dynamically and seamlessly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described with reference to the accompanying drawings.

Figure 1:
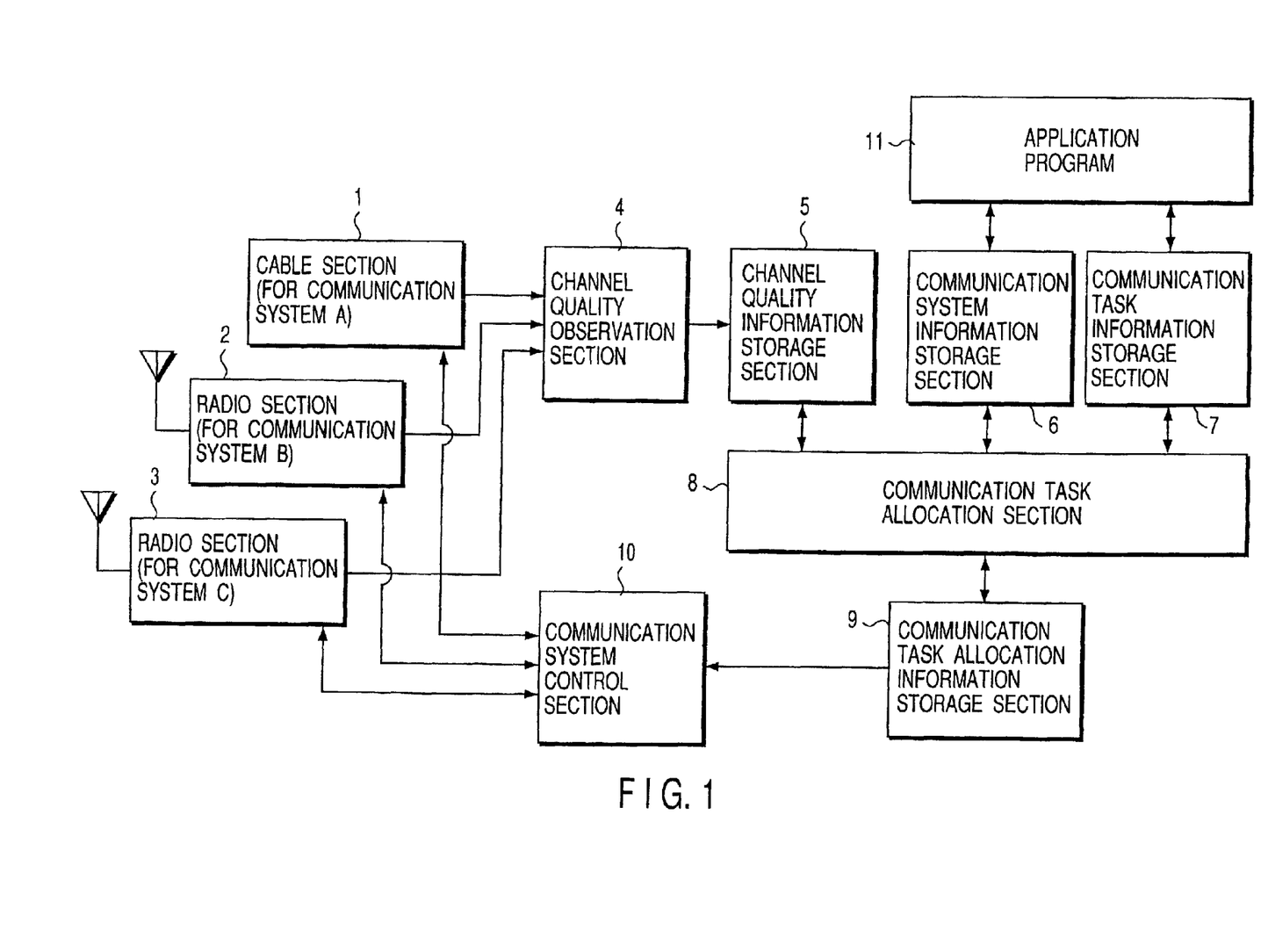
FIG. 1 is a diagram showing a constitution of a communication apparatus according to an embodiment of the present invention.

FIG. 1 is a diagram showing a constitution of a communication apparatus according to the embodiment. The communication apparatus appropriately uses a plurality of communication systems A, B and C of different communication modes in parallel. AS shown in FIG. 1, the apparatus comprises a cable section 1, a radio section 2, a radio section 3, a channel quality observation section 4, a channel quality information storage section 5, a communication system information storage section 6, a communication task information storage section 7, a communication task allocation section 8, a communication task allocation information storage section 9 and a communication system control section 10. These sections process communication tasks generated by host software, an application program 11.

The communication system A is a cable communication system. The cable section 1 executes cable communications through the communication system A. The communication systems B and C are radio communication systems. The radio sections 2 and 3 execute radio communications through the communication systems B and C respectively.

The channel quality observation section 4 periodically observes the channel qualities of the communication systems. The channel quality information storage section 5 stores as a table the result of the observation by the channel quality observation section 4. The communication system information storage section 6 stores performance information of the respective communication systems. The communication task information storage section 7 stores attribute information on a communication task, when the communication task occurs. The communication task allocation section 8 allocates a communication task to one of the communication systems dynamically and appropriately based on the channel quality information, the performance information and the communication task information stored in the channel quality information storage section 5, the communication system information storage section 6 and the communication task information storage section 7. The communication task allocation information storage section 9 stores communication task allocation information representing to which communication system each communication task is allocated. The communication system control section 10 transmits the communication task to the corresponding communication system based on the communication task allocation information stored in the communication task allocation information storage section 9.

Figure 2:
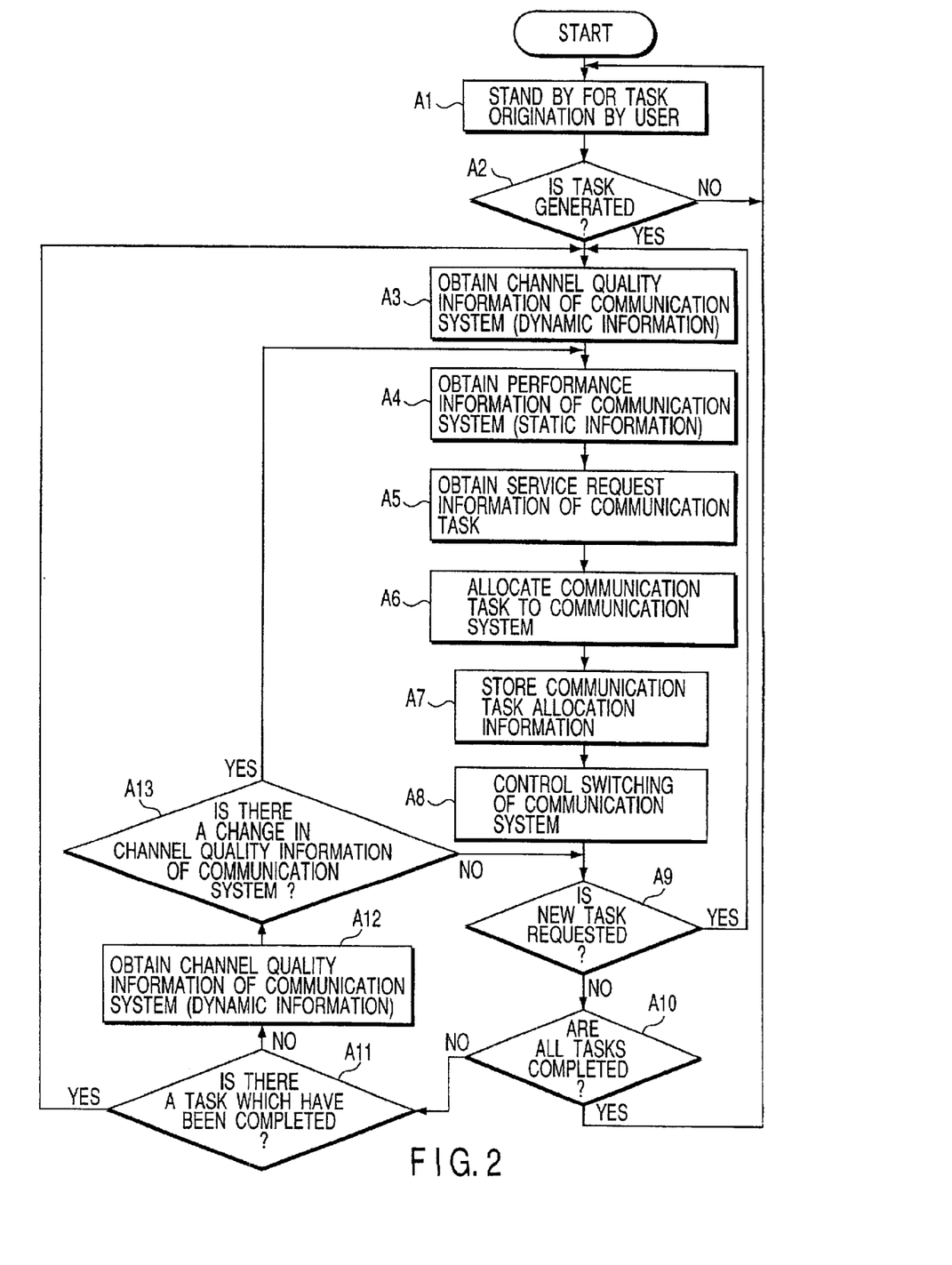
FIG. 2 is a flowchart for explaining procedures for processing in parallel a plurality of communication tasks using a plurality of communication systems of the communication apparatus according to the embodiment.

FIG. 2 is a flowchart for explaining procedures for processing in parallel a plurality of communication tasks using the communication systems. In the following description, it is assumed that the cable section 1 is designed for USB, the radio section 2 for Bluetooth, and the radio section 3 for IrDA in a personal computer used in the user's personal environment.

First, a state where no communication system is used (a standby state for a task request by the user) is assumed (step A1). In this state, if there is a request from the user, for example, a file transfer request (YES in step A2), the communication task allocation section 8 obtains channel quality information of the communication system, performance information and service request information of the communication task respectively from the channel quality information storage section 5, the communication system information storage section 6 and the communication task information storage section 7 (steps A3 to A5).

Figure 3:
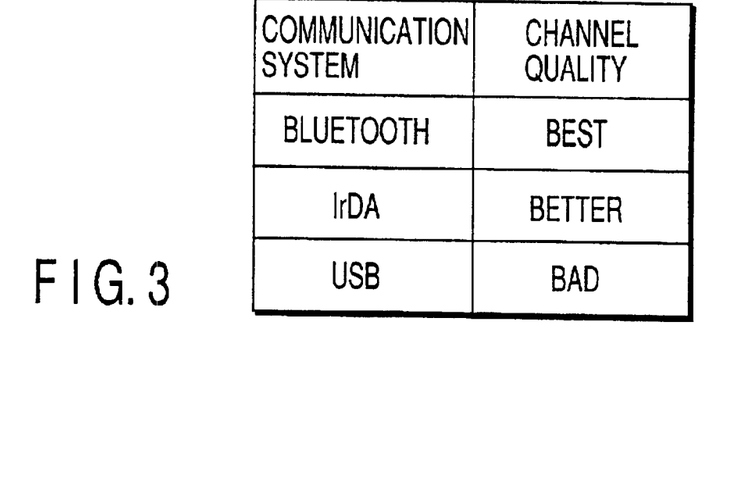
FIG. 3 is a diagram showing an example of a channel quality information table of the communication apparatus according to the embodiment.

FIG. 3 is a diagram showing an example of a channel quality information table stored in the channel quality information storage section 5. The table represents the channel qualities of the respective communication systems. In this example, the conditions of the channels are rated at four levels as "Best", "Better", "Good" and "Bad". To determine at which level a channel quality is rated, it is preferable to observe at least one of the intensity of a received signal and the data error rate.

Figure 4:
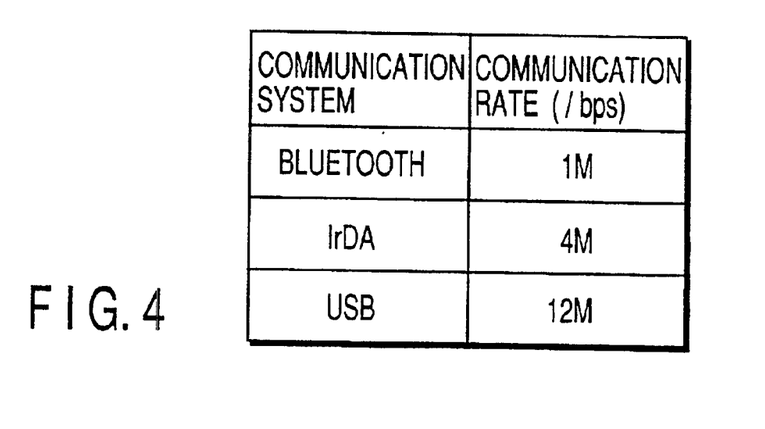
FIG. 4 is a diagram showing an example of a communication system performance information table of the communication apparatus according to the embodiment.
Figure 5:
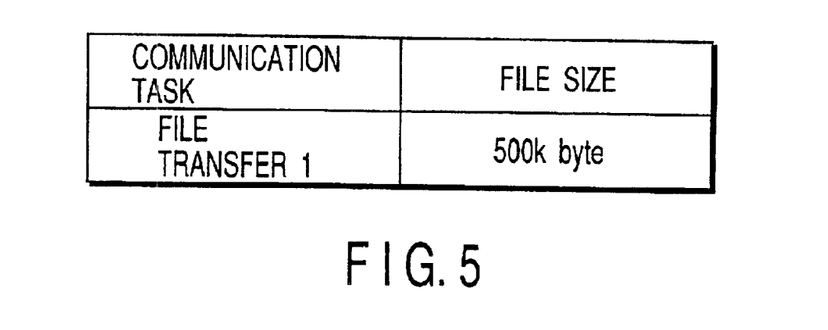
FIG. 5 is a diagram showing an example of a task information table representing a case where a file transfer is requested in the communication apparatus according to the embodiment.

FIG. 4 shows an example of a table representing performance of the communication systems stored in the communication system information storage section 6. In this example, the communication rate is used as an index of the performance of each communication system. FIG. 5 shows an example of a task information table stored in the communication task information storage section 7. In this example, the table represents that the communication task is a file transfer 1 and the file size is indicated as information.

Based on the channel quality information (FIG. 3), the performance information (FIG. 4) and the communication task information (FIG. 5), the communication task allocation section 8 determines by which communication system the file transfer 1 should be processed (step A6). For example, the communication systems rated at "Better" or higher are given priorities in descending order of communication rate. Then, the communication systems rated at "Good" are given priorities in descending order of communication rate. In this case, it is determined that file transfer 1 is processed by IrDA. Then, the communication task allocation section 8 stores in the communication task allocation information storage section 9 the information that the process of file transfer 1 is allocated to IrDa (step A7). The communication system control section 10 allocates the file transfer task to the selected communication system with reference to the information stored the communication task allocation information storage section 9 (step A8).

Figure 6:
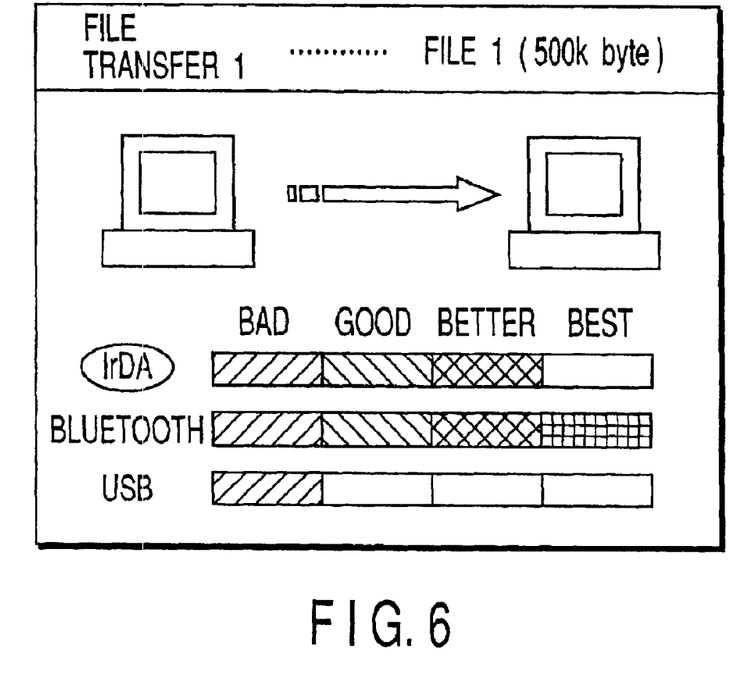
FIG. 6 is a diagram showing an example of a display screen of a personal computer representing a case where the file transfer is executed in the communication apparatus of the embodiment (during file transfer 1)

FIG. 6 shows an example of a display screen of the personal computer under execution of file transfer 1. In the screen, the channel qualities of the communication systems, i.e., "Best", "Better", "Good" and "Bad" are indicated by status bars. The communication system effective for the task is encircled by an oval. As described above, IrDA is selected in this embodiment.

Figure 7:
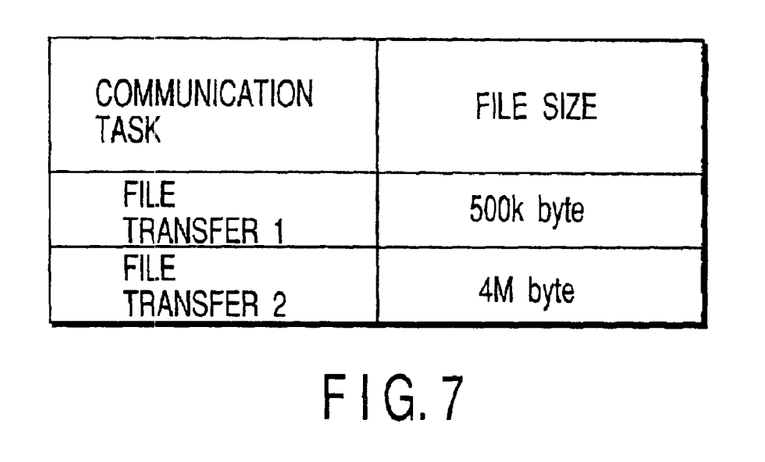
FIG. 7 is a diagram showing an example of a task information table representing a case where a plurality of file transfers are requested in the communication apparatus of the embodiment.

Then, it is assumed that an additional file transfer 2 is requested during execution of the aforementioned file transfer 1 (step A9). In this case, the communication task information table shown in FIG. 5 is written as shown in FIG. 7. The communication task allocation section 8 again obtains channel quality information of the communication system (FIG. 3), performance information (FIG. 4) and the communication task information (FIG. 7) respectively from the channel quality information storage section 5, the communication system information storage section 6 and the communication task information storage section 7. Based on these information items, the optimization of allocation of the file transfers to the communication systems can be performed such that the two file transfers are processed by different communication systems (steps A3 to A8).

Figure 8:
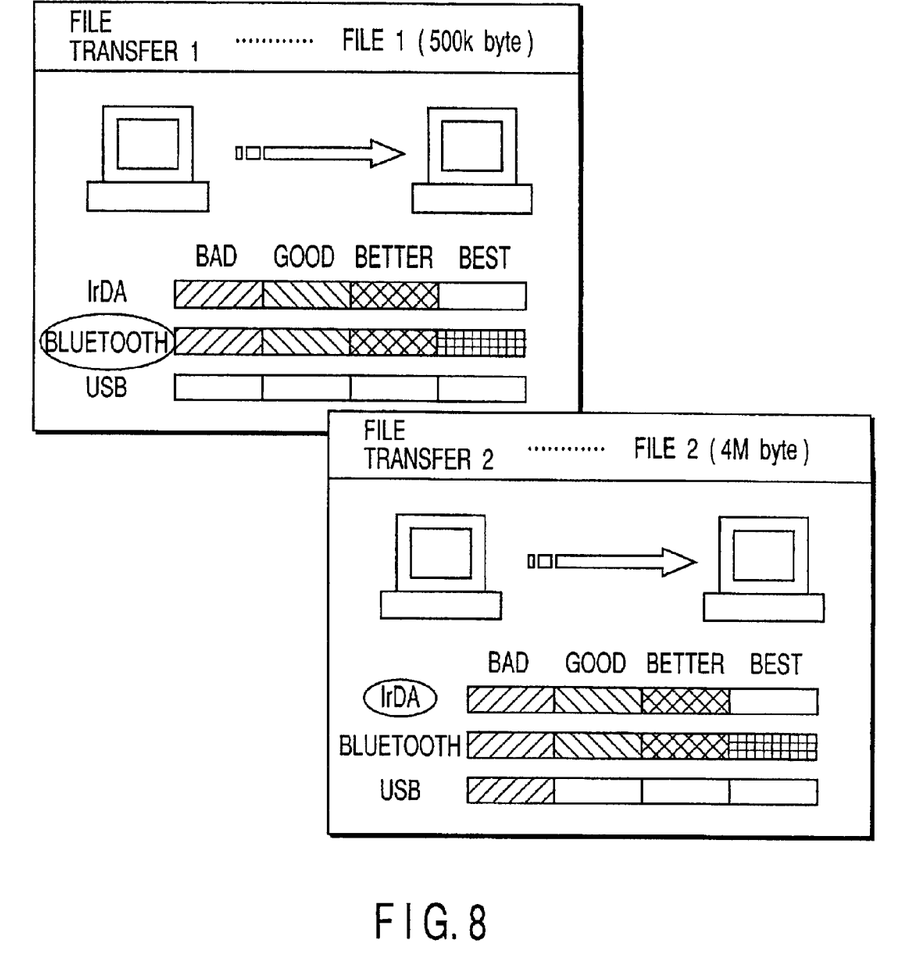
FIG. 8 is a diagram showing an example of a display screen of the personal computer representing a case where an additional file transfer is requested in the state shown in FIG. 6 in the communication apparatus of the embodiment (during file transfers 1 and 2)

Larger the file size is, the communication systems rated at "Better" or higher having higher communication rate is assigned to the file transfer. For example, the file transfer of the largest file is assigned to the communication systems at "Better" or higher having highest communication rate. The file transfer of the second largest file is assigned to the communication systems at "Better" or higher having second highest communication rate. The same logic can be applied to the remaining file transfer. If the file transfer cannot be assigned to the communication systems rated at "Better" or higher, it is assigned to the communication systems rated at "Good" and in descending order of communication rate. In this case, it is determined, as shown in FIG. 8, that file transfers 1 and 2 are respectively processed by Bluetooth and IrDA.

Figure 9:
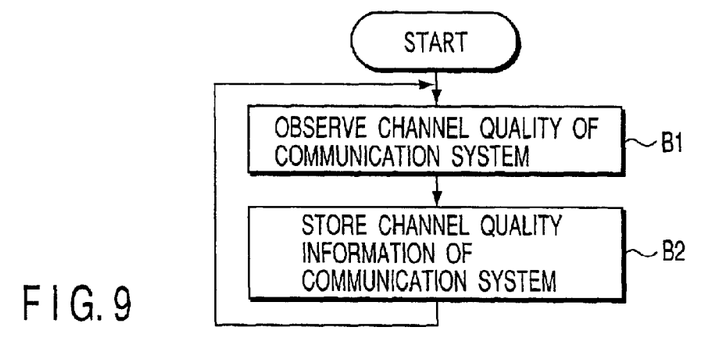
FIG. 9 is a flowchart for explaining procedures for executing quality observation of channels of the respective communication systems of the communication apparatus according to the embodiment.

FIG. 9 shows a flowchart for explaining detailed procedures for channel quality observation (steps A3 and A12).

The channel quality observation section 4 observes the channel qualities of the respective communication systems (step B1). Information on the observed channel qualities is stored in the channel quality information storage section 5 (step B2).

Since the channel qualities of the communication system are observed dynamically, the latest information on the channel qualities are stored in the channel quality information storage section 5. Therefore, even during execution of communication tasks by the communication systems, communication is always performed in the optimum condition.

Figure 10:
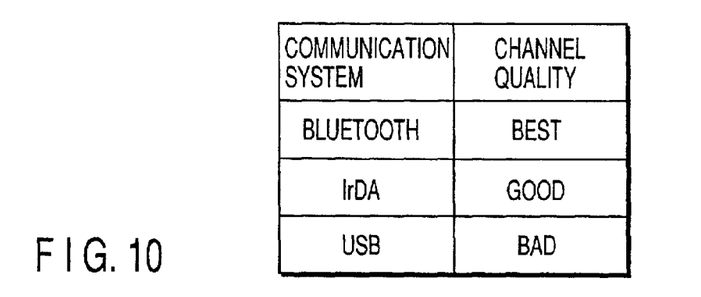
FIG. 10 is a diagram showing an example of a channel quality information table representing a case where the channel quality of IrDA of the communication apparatus of the embodiment has been changed from that shown in FIG. 3.

Therefore, it can be assumed that there is a change in channel quality of a communication system during execution of the file transfer (step A13). If the channel quality of IrDA is changed from the condition shown in FIG. 3, the channel quality information table is rewritten, for example, as shown in FIG. 10. The communication task allocation section 8 again obtains channel quality information of the communication system (FIG. 10), performance information (FIG. 4) and the communication task information (FIG. 8) respectively from the channel quality information storage section 5, the communication system information storage section 6 and the communication task information storage section 7. Then, the allocation of the file transfers to the communication systems can be optimized dynamically (steps A4 to A8).

Figure 11:
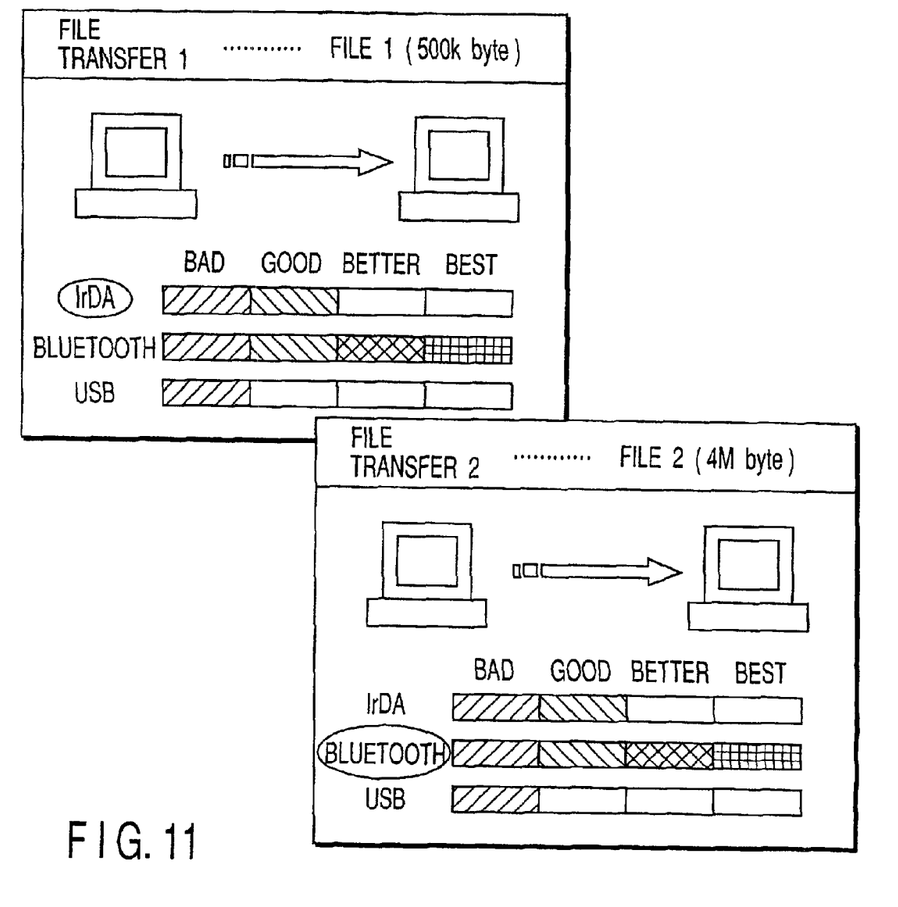
FIG. 11 is a diagram showing an example of a display screen of the personal computer representing a case where the channel quality of IrDA of the communication apparatus of the embodiment has been changed from that shown in FIG. 3 (during file transfers 1 and 2)

Larger the file size is, the communication systems rated at "Better" or higher having higher communication rate is assigned to the file transfer. For example, the file transfer of the largest file is assigned to the communication systems at "Better" or higher having highest communication rate. The file transfer of the second largest file is assigned to the communication systems at "Better" or higher having second highest communication rate. The same logic can be applied to the remaining file transfer. If the file transfer cannot be assigned to the communication systems rated at "Better" or higher, it is assigned to the communication systems rated at "Good" and in descending order of communication rate. In this case, it is determined, as shown in FIG. 11, that file transfers 1 and 2 are respectively processed by IrDA and Bluetooth. Alternatively, assuming that a transfer of the largest file is allocated to a system of the highest communication rate of the communication systems rated at "Good" or higher, it is determined that file transfers 1 and 2 are respectively processed by Bluetooth and IrDA. Further, another determinant for priorities may be used.

Regarding the communication task information (FIGS. 5 and 7), only file size information is referred to in the example of the file transfer described above. In addition, information on what kind of data is to be transferred (e.g., information for discriminating a file from sound/animation data called stream contents) may be referred to. Transfers of a file and sound/animation data have the following characteristics.

Figure 12:
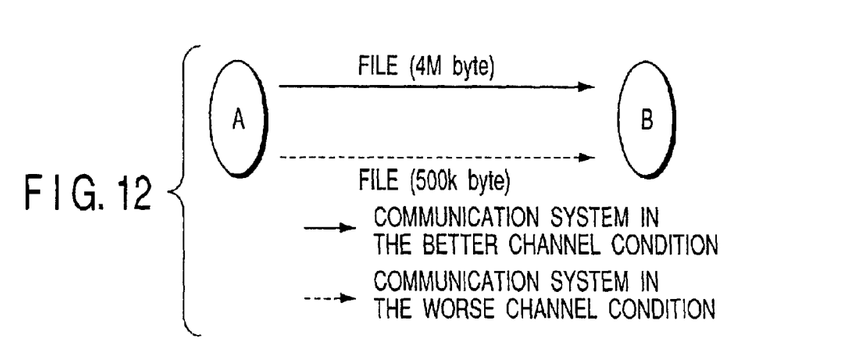
FIG. 12 is a diagram showing an example of allocation of a communication task to a channel depending on the kind of transfer data in the communication apparatus of the embodiment.
Figure 13:
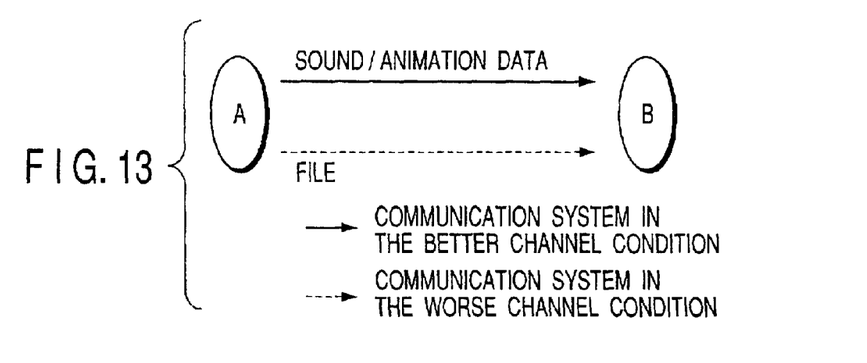
FIG. 13 is a diagram showing another example of allocation of a communication task to a channel depending on the kind of transfer data in the communication apparatus of the embodiment.

A file transfer does not require real-time processability so much. Therefore, for example, when a file is transmitted by divided packets, even if transfers of the packets are made at random intervals and require a long period of time, there will be no problem so far as the file is reproduced on the receiving side. Moreover, since there is no timing constraint on transfer of a file, it is easy to retransfer the file. In contrast, since sound/animation data is transferred in order for the user to look at and listen to it in real time, the delay of transfer in divided packets must be lessened. Therefore, it is necessary that packets be transferred at as regular intervals as possible. For this purpose, a frequency band which is wide to a certain extent is also required. FIGS. 12 and 13 show examples of allocation of communication tasks to channels depending on the kind of transfer data.

To establish communication between terminals A and B, if the communication tasks generated at the terminal A are file transfers only (FIG. 12), the allocation of the communication systems is determined in accordance with the file sizes. In this case, as shown in FIG. 12, a transfer of a larger file is allocated to a communication system having a better channel condition, and a transfer of a smaller file is allocated to a communication system having a channel condition worse than that of the former. On the other hand, if the communication tasks are a file transfer and a sound/animation data transfer (FIG. 13), the transfer of sound/animation data which requires real-time processability is allocated to a communication system having a better channel condition, and a transfer of a file, which requires less real-time processability, is allocated to a communication system having a channel condition worse than that of the former.

Figure 14:
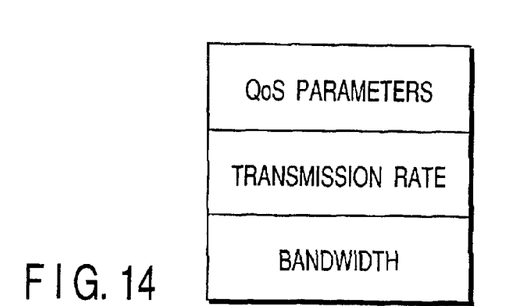
FIG. 14 is a diagram showing an example of parameters of QoS information of the communication apparatus of the embodiment.

Further, QoS information may be used as communication task information. The QoS information is a parameter representing an index as to how data (a packet) is transferred. It includes, for example, a transmission rate and a bandwidth. FIG. 14 shows an example of parameters of QoS information. When each communication task is allocated to a communication system, it is preferable to select a channel that satisfies requirements for the values of parameters of the QoS information corresponding to the communication task. A specific value of a parameter of the QoS information may be prepared by the communication task information storage section 7, depending on whether the communication task is a transfer of a file or sound/animation data, i.e., the attribute of the communication task.

Figure 15:
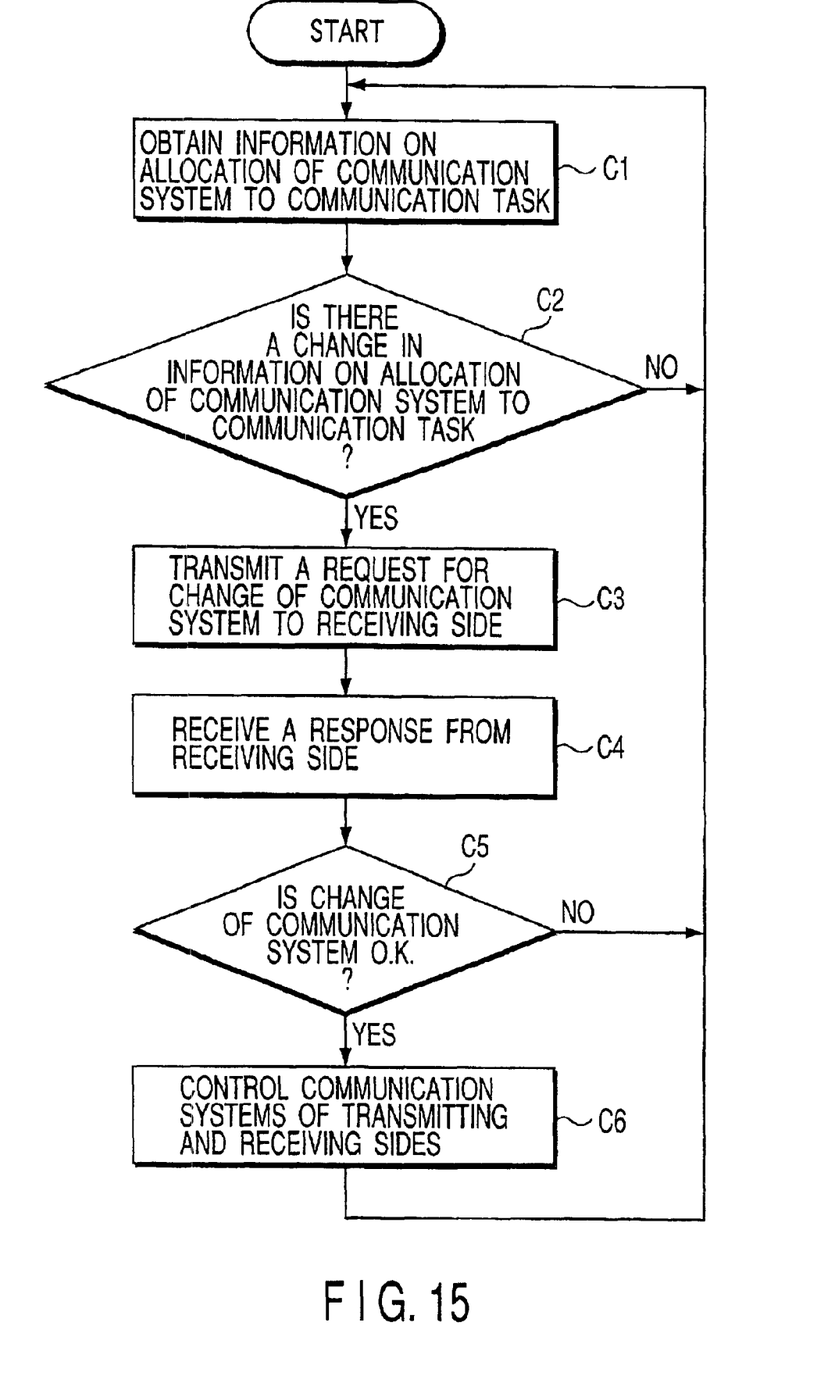
FIG. 15 is a flowchart showing session control steps of the communication apparatus of the embodiment.

As described before, when allocation of a communication task to a communication system is changed by generation of a new communication task or a change in channel quality of the communication system, the allocation is changed by the communication task information storage section 7, the communication task allocation section 8, the communication task allocation information storage section 9 and the communication system control section 10. FIG. 15 is a flowchart showing a session control for changing the allocation. In the following, a case where the aforementioned new file transfer 2 is requested will be described.

When a transfer of the new file 2 as mentioned above is requested (YES in step C2), the communication system control section 10 obtains from the communication task allocation information storage section 9 the information that the file transfer 1 should be processed by Bluetooth and the file transfer 2 should be processed by IrDA. Based on the information, the communication system control section 10 supplies to the file receiving side a request for change to the communication systems corresponding to the respective file transfers (step C3).

The receiving side receives the request for change from the transmitting side, and returns a corresponding response to the transmitting side (step C4). If it is possible to change the communication system (YES in step C5), the communication system control sections 10 of both the transmitting and receiving sides execute control such that the file transfer 1 is processed by Bluetooth and the file transfer 2 is processed by IrDa (step C6). Then, the transmission and reception are synchronized with each other.

Figure 16:
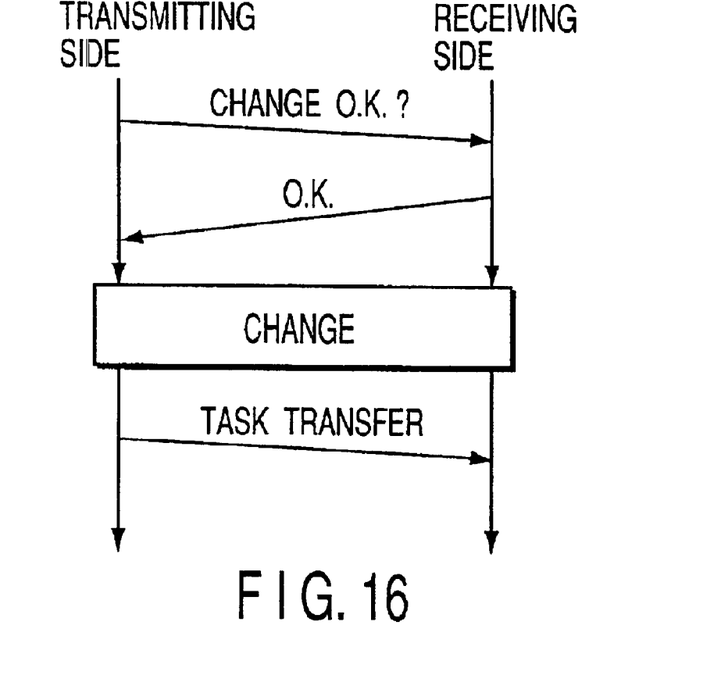
FIG. 16 is a conceptual diagram (timing chart) for explaining more specifically the session control steps of the communication apparatus of the embodiment.
Figure 17:
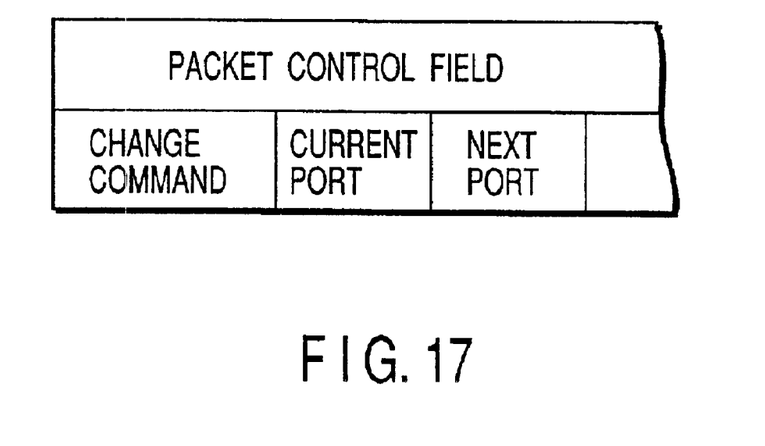
FIG. 17 is a conceptual diagram (an example of addition of control data) for explaining more specifically the session control steps of the communication apparatus of the embodiment.

FIGS. 16 and 17 are conceptual diagrams for explaining more specifically the session control for dynamically and seamlessly executing a change of communication tasks allocated to communication systems.

For example, when the communication task under processing by IrDA is to be processed by Bluetooth, control data to the effect that the communication system is to be changed to Bluetooth is added to the packet of the communication task being processed by IrDA, and transmitted to the receiving side. If the transmitting side receives from the receiving side a response to the effect that the change is possible, the communication system is changed so that the communication task is executed by Bluetooth (FIG. 16).

The control data to the effect that the system is changed may be added to, for example, the packet control field, as shown in FIG. 17.

As described above, with the communication apparatus of the present invention, a plurality of communication tasks can be processed in parallel by appropriately allocating the communication tasks to the communication systems based on the channel qualities of the respective communication systems.

Further, the communication system, to which a communication task is allocated, can be changed to another communication system without interrupting the communication task while maintaining the synchronization with the other end of communication. Thus, the optimization of allocation of the communication tasks to the communication systems can be performed dynamically and seamlessly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus for processing a plurality of communication tasks by a plurality of communication systems of different communication modes, said apparatus comprising:

means for observing channel qualities of communication channels respectively established by the plurality of communication systems;

means for obtaining performance information of each of the plurality of communication systems and attribute information of each of the plurality of communication tasks; and means for controlling allocation of the plurality of communication tasks to the plurality of communication systems based on the performance information of each of the plurality of communication systems and the attribute information of each of the plurality of communication tasks obtained by the information obtaining means, and the channel qualities observed by the channel quality observing means.

2. A communication apparatus according to claim 1, wherein the communication system control means comprises means for changing the communication system to which a communication task is allocated to another communication system without interrupting communication under execution while maintaining synchronization with another end of communication.

3. A communication apparatus according to claim 1, wherein the channel quality observing means periodically observes the channel qualities.

4. A communication apparatus according to claim 1, wherein the plurality of communication systems are selected from a group consisting of a plurality of cable communication systems, a plurality of radio communication systems and a combination of at least one cable communication system and at least one radio communication system.

5. A communication apparatus according to claim 1, wherein the channel quality observing means observes at least one of intensity of a received signal and a data error rate of each of the communication systems.

6. A communication apparatus for processing a plurality, of communication tasks by a plurality of communication systems of different communication modes, said apparatus comprising:

means for observing channel qualities of communication channels respectively established by the plurality of communication systems;

means for obtaining performance information of each of the plurality of communication systems and QoS information of each of the plurality of communication tasks; and means for controlling allocation of the plurality of communication tasks to the plurality of communication systems based on the performance information of each of the plurality of communication systems and the QoS information of each of the plurality of communication tasks obtained by the information obtaining means, and the channel qualities observed by the channel quality observing means.

7. A communication apparatus according to claim 6, wherein the information obtaining means prepares the QoS information based on an attribute of the communication task.

8. A communication apparatus for processing a communication task in a first communication mode and a second communication mode, comprising:

first communicating means for communicating in the first communication mode;

second communicating means for communicating in the second communication mode;

means for obtaining attribute information of a first communication task and a second communication task;

means for allocating the first communication task to the first communication means, and the second communication task to the second communication means, in accordance with the attribute information; and means for controlling the first communicating means and the second communicating means so as to process the first communication task and the second communication task in parallel.

9. A communication apparatus according to claim 8, wherein the allocating means comprises means for changing the communicating means to which a communication task is allocated to another communicating means without interrupting communication under execution while maintaining synchronization with another end of communication.

10. A communication apparatus according to claim 8, wherein the first communication mode and the second communication mode are selected from a group consisting of a plurality of cable communication mode, a plurality of radio communication mode, and a combination of one cable communication mode and one radio communication mode.

11. A communication apparatus for processing a communication task in a first communication mode and a second communication mode, comprising:

first communicating means for communicating in the first communication mode;

second communicating means for communicating in the second communication mode;

means for obtaining performance information of the first communication means and the second communication means, and attribute information of a first communication task and a second communication task;

means for allocating the first communication task to the first communication means, and the second communication task to the second communication means, in accordance with the performance information and the attribute information; and means for controlling the first communicating means and the second communicating means so as to process the first communication task and the second communication task in parallel.

12. A communication apparatus according to claim 11, wherein the allocating means comprises means for changing the communicating means to which a communication task is allocated to another communicating means without interrupting communication under execution while maintaining synchronization with another end of communication.

13. A communication apparatus according to claim 11, wherein the first communication mode and the second communication mode are selected from a group consisting of a plurality of cable communication mode, a plurality of radio communication mode, and a combination of one cable communication mode and one radio communication mode.

14. A communication method for processing a plurality of communication tasks by a plurality of communication systems of different communication modes, said method comprising the steps of:

observing channel qualities of communication channels respectively established by the plurality of communication systems;

obtaining performance information of each of the plurality of communication systems and attribute information of each of the plurality of communication tasks; and controlling allocation of the plurality of communication tasks to the plurality of communication systems based on the performance information of each of the plurality of communication systems and the attribute information of each of the plurality of communication tasks obtained by the information obtaining step, and the channel qualities observed by the channel qualities observing step.

15. A communication method according to claim 14, wherein the allocation controlling step changes the communication system to which a communication task is allocated to another communication system without interrupting communication under execution while maintaining synchronization with another end of communication.

16. A communication method according to claim 14, wherein the channel qualities observing step periodically observes the channel qualities.

17. A communication method according to claim 14, wherein the plurality of communication systems are a combination of at least one cable communication system and at least one radio communication system.

18. A communication method according to claim 14, wherein the channel qualities observing step observes at least one of intensity of a received signal and a data error rate of each of the communication systems.

19. A communication method for processing a plurality of communication tasks by a plurality of communication systems of different communication modes, said method comprising the steps of:

observing channel qualities of communication channels respectively established by the plurality of communication systems;

obtaining performance information of each of the plurality of communication systems and QoS information of each of the plurality of communication tasks; and controlling allocation of the plurality of communication tasks to the plurality of communication systems based on the performance information of each of the plurality of communication systems and the QoS information of each of the plurality of communication tasks obtained by the information obtaining step, and the channel qualities observed by the channel qualities observing step.

20. A communication method according to claim 19, wherein the information obtaining step prepares the QoS information based on an attribute of the communication task.

21. A communication method for processing a communication task in a first communication mode and a second communication mode, said method comprising the steps of:

obtaining attribute information of a first communication task and a second communication task;

allocating the first communication task to the first communication mode, and the second communication task to the second communication mode, in accordance with the attribute information; and controlling to process the first communication task and the second communication task in parallel.

22. A communication method according to claim 21, wherein the allocating step changes the communication mode to which a communication task is allocated to another communication mode without interrupting communication under execution while maintaining synchronization with another end of communication.

23. A communication method according to claim 21, wherein the first communication mode and the second communication mode are selected from a group consisting of a plurality of cable communication mode, a plurality of radio communication mode, and a combination of one cable communication mode and one radio communication mode.

24. A communication method for processing a communication task in a first communication mode and a second communication mode, said method comprising the steps of:

obtaining performance information of the first communication mode and the second communication mode, and attribute information of a first communication task and a second communication task;

allocating the first communication task to the first communication mode, and the second communication task to the second communication mode, in accordance with the performance information and the attribute information; and controlling to process the first communication task and the second communication task in parallel.

25. A communication method according to claim 24, wherein the allocating step changes the communication mode to which a communication task is allocated to another communication mode without interrupting communication under execution while maintaining synchronization with another end of communication.

26. A communication method according to claim 24, wherein the first communication mode and the second communication mode are selected from a group consisting of a plurality of cable communication mode, a plurality of radio communication mode, and a combination of one cable communication mode and one radio communication mode.

* * * * *